US012188762B1

United States Patent
Tongue et al.

(10) Patent No.: US 12,188,762 B1
(45) Date of Patent: Jan. 7, 2025

(54) BIREFRINGENCE MITIGATION IN AN OPTICAL NETWORK

(71) Applicant: The Shape Sensing Company, Austin, TX (US)

(72) Inventors: Alex Tongue, Dripping Springs, TX (US); Justin Braun, Austin, TX (US)

(73) Assignee: The Shape Sensing Company, Austin, TX (US)

( * ) Notice: Subject to any disclaimer, the term of this patent is extended or adjusted under 35 U.S.C. 154(b) by 0 days.

(21) Appl. No.: 18/885,002

(22) Filed: Sep. 13, 2024

Related U.S. Application Data

(60) Provisional application No. 63/582,624, filed on Sep. 14, 2023.

(51) Int. Cl.
*G01B 11/24* (2006.01)
(52) U.S. Cl.
CPC ................ *G01B 11/2441* (2013.01)
(58) Field of Classification Search
CPC ................................. G01B 11/2441
See application file for complete search history.

(56) References Cited

U.S. PATENT DOCUMENTS

| | | |
|---|---|---|
| 6,179,611 B1 | 1/2001 | Everett et al. |
| 6,522,407 B2 | 2/2003 | Everett et al. |
| 6,784,428 B2 | 8/2004 | Rabolt et al. |
| 9,553,664 B2 | 1/2017 | Horikx et al. |
| 2015/0263804 A1* | 9/2015 | Horikx ................. H04B 10/071 398/16 |

* cited by examiner

*Primary Examiner* — Jamil Ahmed
(74) *Attorney, Agent, or Firm* — SoCal IP Law Group LLP; Steven C. Sereboff

(57) ABSTRACT

Birefringence in optical fibers is mitigated using optical frequency domain reflectometry (OFDR) having a coupling point optically connected to a reference arm with a first, single mode fiber segment and optically connected to a measurement arm having single mode optical segments and polarization maintaining optical segments. The measurement arm has a first optical circulator connected to the coupling point via a second, single mode fiber segment; a second optical circulator for sending optical radiation to a sensor; a single mode optical segment between the first optical circulator and the second optical circulator including a third, single mode fiber segment. The measurement arm has an outbound path including a first polarization maintaining optical segment between the first and second optical circulator for rotating a polarization of the optical radiation once relative to a second polarization maintaining optical segment between the first and second optical circulator.

22 Claims, 7 Drawing Sheets

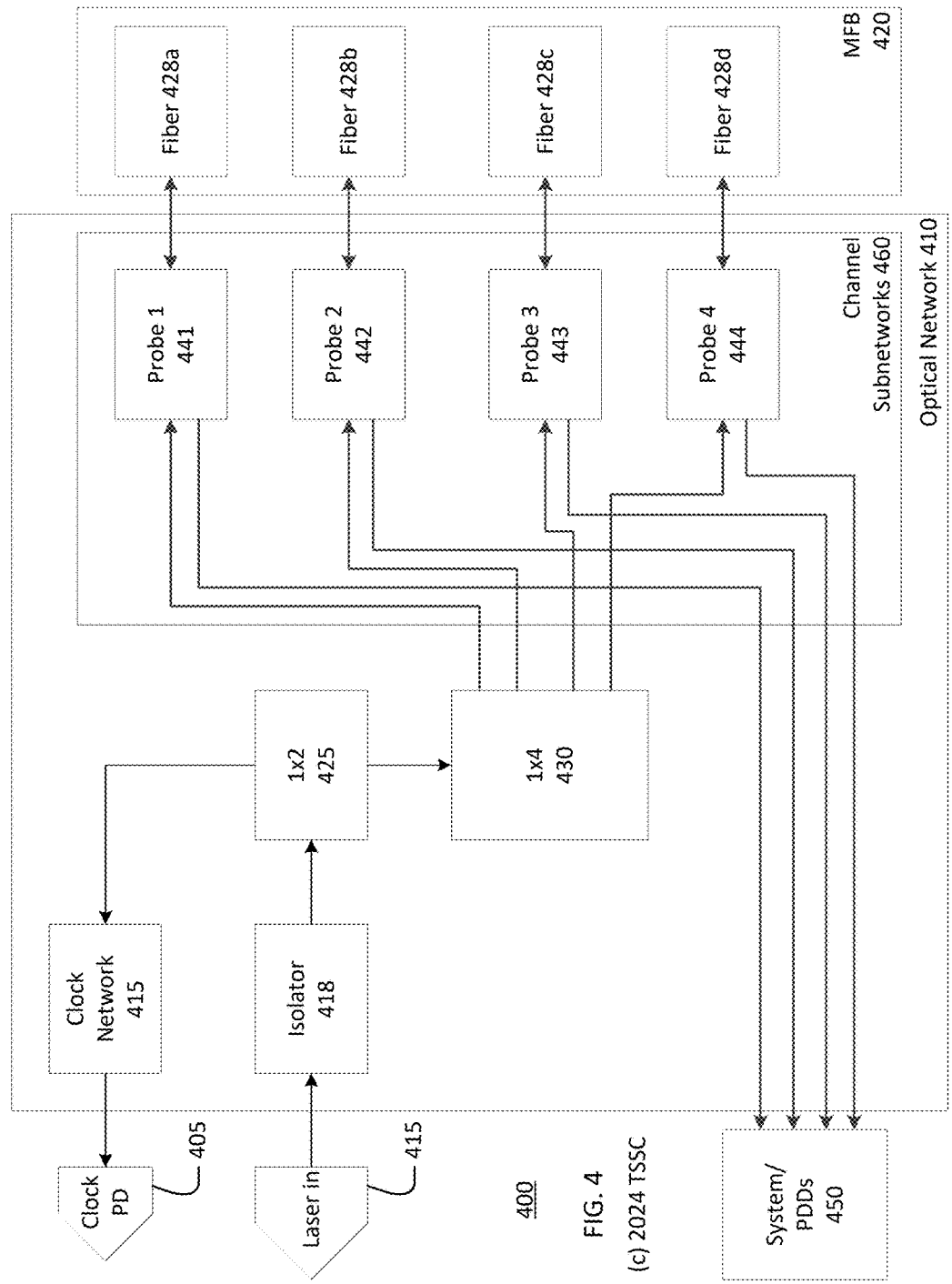

(c) 2024 TSSC

BIREFRINGENCE MITIGATION IN AN OPTICAL NETWORK

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from U.S. provisional patent application No. 63/582,624 filed Sep. 14, 2023 which is incorporated herein by reference.

BACKGROUND

Field

Birefringence mitigation in an optical network using optical frequency domain reflectometry (OFDR).

Description of the Related Art

Fiber optic 3D position and/or shape sensing devices generally include a multicore optical fiber (MOF) for determining position and shape of an object. The multicore optical fiber, in turn, typically includes at least two cores encompassed in a common cladding, positioned in a relative relationship to one another and spaced apart from each other to reduce mode coupling distortions between the fiber cores. Such devices further include an interrogator that transmits light to, and receives reflected light from, the MOF.

However, MOF shape-sensing devices have several shortcomings. First, a MOF can be relatively difficult to couple to an interrogator and require both the MOF and the interrogator to have specialized coupling components. Second, typical MOF exhibits minimal sensitivity to twist. Third, MOFs that feature fiber Bragg gratings (FBGs) have the FBGs on each core emplaced in the same relative location and aligned with each other—due to the process by which FBGs are incorporated into the multiple cores of such MOFs during their manufacture—and thus gaps between FBGs are also aligned and thereby define areas for which the MOF cannot monitor. Fourth, compared to single-core optical fibers, MOFs are substantially more expensive to manufacture and very costly to customize from the sole and ubiquitous MOF design universally available today (i.e., where producing any variation would be very expensive if even possible). Finally, most MOF-based sensing solutions utilize wavelength division multiplexing (WDM) which limits the number of FBGs and, in turn, limits sensing precision.

Interrogation data from a measurement fiber, and thus 3D shape measurements, are subject to unwanted errors which stem from birefringence. This birefringence may be due to properties inherent to the fiber and or the FBGs inscribed within its core, to induced birefringence through deforming the fibers, or other nonlimiting factors. In order to accurately assess the effect of an external influence on the fiber properties, a reference fiber may be provided, such that a comparison may be made between the interrogation data of the measurement fiber and the interrogation data of the reference fiber.

Various techniques have been proposed for obtaining such a comparison.

Optical networks may be formed from single core optical fibers and passive optical components such as fused couplers, isolators, circulators, and other such devices for the distribution and control of optical signals. Optical networks may themselves branch into subnetworks. Single core optical fibers may be single mode (SM), polarization insensitive; or polarization-maintaining (PM). SM can be polarization insensitive or PM, such as where PM is a subset of SM.

Standard single mode optical fibers are made to be circularly symmetric to minimize birefringence. Since they are not inherently birefringent and are subject to local changes in birefringence as a result of deformation and temperature changes, they do not maintain polarization over long distances well.

On the other hand, PM optical fibers are constructed differently to create a significant amount of birefringence. PM optical fiber is a type of single-mode optical fiber designed to maintain the polarization state of light propagating through them. When light travels through a polarization insensitive single mode optical fiber, environmental factors like temperature changes, bending, and twisting can cause the polarization state of the light to drift or become random. PM optical fiber is designed to prevent cross-coupling between orthogonal polarization modes (which typically would lead to degradation in polarization fidelity) and this is achieved by inducing a significant difference in propagation constant (also known as birefringence) between the orthogonal polarization modes.

An optical network may include one or more optical devices. An optical device is a device for producing, distributing, coupling light, or controlling various optical properties. Examples include optical fibers, half-wave plate, beam splitters, optical circulators and Faraday rotators.

A half-wave plate is an optical device which rotates the state of polarization of linearly polarized light.

A polarization beam splitter is an optical device which splits the incident beam into two beams with orthogonal polarization states.

An optical circulator is a three- or four-port optical device designed such that light entering any port exits from the next. This means that if light enters port 1 it is emitted from port 2, but if some of the emitted light is reflected back to the circulator, it does not come out of port 1 but instead exits from port 3. Fiber-optic circulators are used to separate optical signals that travel in opposite directions in an optical fiber, for example to achieve bi-directional transmission over a single fiber. Because of their high isolation of the input and reflected optical powers and their low insertion loss, optical circulators are widely used in advanced communication systems and fiber-optic sensor applications. Optical circulators are non-reciprocal optics, which means that changes in the properties of light passing through the device are not reversed when the light passes through in the opposite direction.

A Faraday rotator is an optical device which rotates the state of polarization. Linearly polarized light sent through a Faraday rotator will be rotated by 45° independently of the input angle. Polarization is rotated non-reciprocally, meaning that light entering from the opposite side of the crystal will continue rotating in the same direction relative to the crystal.

DESCRIPTION OF THE DRAWINGS

FIG. 4 is a schematic embodiment of an optical network.

Figure 1:
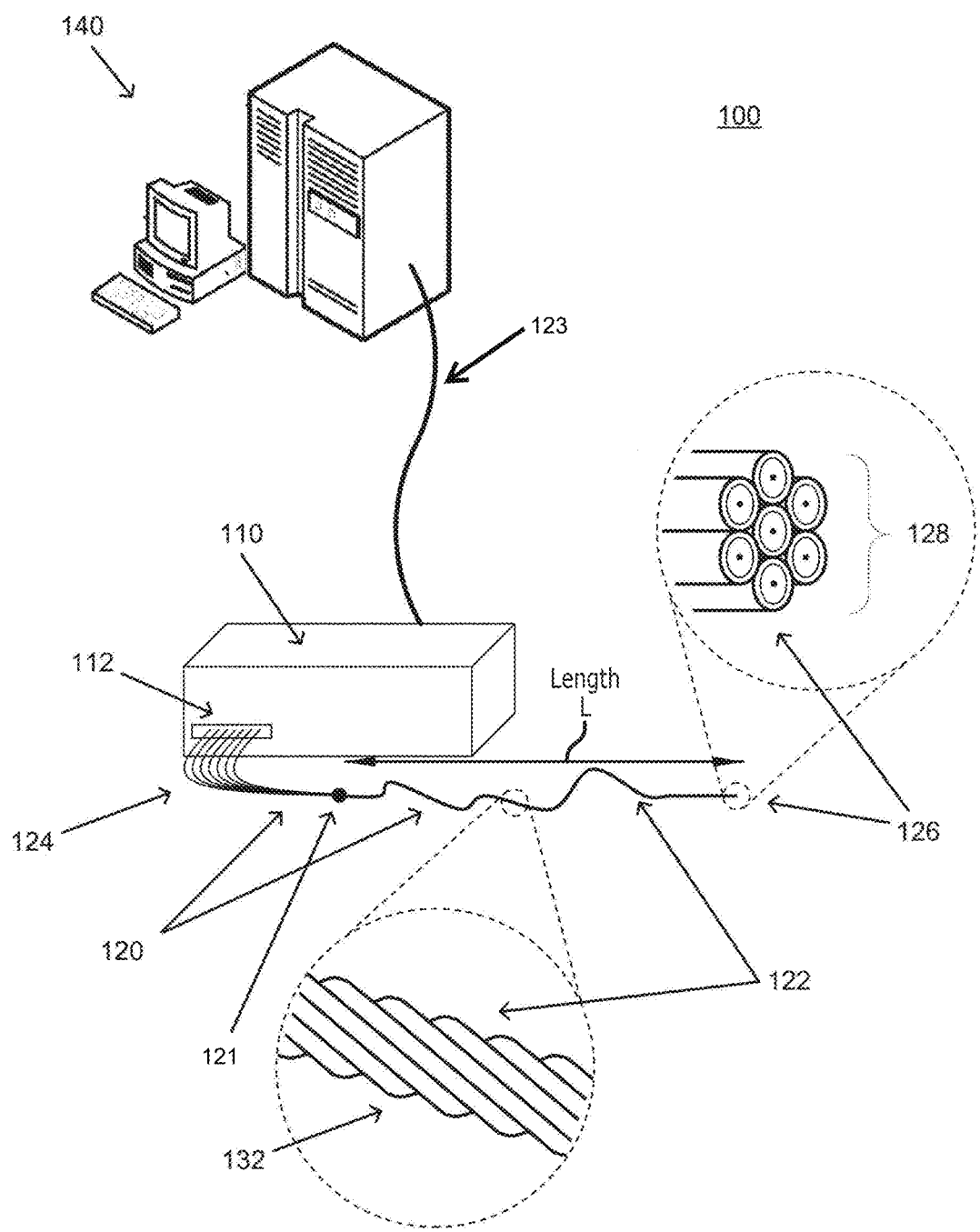
FIG. 1 illustrates a shape sensing device.

Throughout this description, elements appearing in figures are assigned three-digit reference designators, where the most significant digit is the figure number, such as where the element is first introduced, and the two least significant digits are specific to the element. An element that is not described in conjunction with a figure may be presumed to have the same characteristics and function as a previously-described element having a reference designator with the same least significant digits.

DETAILED DESCRIPTION

Structural devices and objects can undergo shape changes when exposed to certain environments or conditions, in which case it may be beneficial to know the degree of such shape changes in order to adapt to or compensate for such changes. For this purpose, a fiber optic sensor embedded in or attached to the structure may monitor the dynamic shape or relative position of the structure and, in certain instances, may do so without inaccuracies being introduced due to temperature or load effects. In a similar manner, the specific state of intentionally flexible structures may be determined at any point in time by measuring the dynamic shape of such structures at such time.

Fiber optic sensors utilize one or more fiber optic components to measure shape changes. Compared to other sensors, fiber optic sensors are particularly useful in smart structures, health monitoring, and other applications because of their relatively small size, low cost, multiplexing capabilities, immunity to electromagnetic interference and vibration, intrinsic safety, and ability to be embedded within or attached to many types of structures operating in a variety of different physical conditions.

Fiber optic sensing enables precise measurement of full strain fields, load distributions, temperature distributions, and other parameters, and thus is becoming pervasive across multiple industries including manufacturing, mechanical, medical, automotive, aerospace and energy.

For "intrinsic" fiber optic sensing—where the fiber optic cable itself is the sensor-changes in a light signal are measured as propagates along an optical fiber's waveguide. These optical sensors can measure temperature, strain, twist, pressure, and other parameters by monitoring the resulting changes in the intensity, phase, polarization, wavelength and/or transit time of light within the fiber. Sensors that vary the reflected wavelength of light based on strain and/or temperature within the fiber are the simplest to measure as only one source and detector are required. These fiber optic sensors can also provide distributed sensing along the entire length of the fiber.

Fiber optic sensors of this kind typically use one of two techniques—based on inherent scattering or based on use of fiber Bragg gratings (FBGs)—for analyzing the changes in the way the light reflects in the optical fiber's waveguide and making calculations with this information to provide accurate measurements. However, each technique has advantages and disadvantages. For example, scattering techniques offer fully distributed data points along a fiber using naturally occurring random imperfections in the fiber optic cable, but this dependence on inherent imperfections is limited as such imperfections are rarely optimal for such purposes. FBGs, on the other hand, can also be fully distributed but only by using a fiber having continuously inscribed FBGs which can be difficult and costly to produce. Nevertheless, because FBGs are purposefully fabricated as well-defined sensors—and thus are much more optimal than imperfections that occur naturally—FBGs have a much higher signal-to-noise ratio and are therefore much more reliable, which in turn enables FBG "interrogators" (the data acquisition hardware) to obtain precise measurements when using continuously inscribed FBGs. Specifically, FBGs use periodic perturbations in refractive index inscribed into the optical fiber to reflect only a specific wavelength of light (described further below), and strain, twist and temperature changes cause spectral shifts in the reflected wavelength and optical frequency domain reflectometry (OFDR) phase changes which are detectable by an interrogator. Stated differently, FBGs exhibit periodic variations in the fiber's index of refraction (the speed of light within the fiber) such that a single FBG consists of a finite length of fiber which contains these perturbations and the entire FBG acts as a wavelength selective mirror. As such, most fiber optic sensing systems on the market today use FBGs to reflect light back to an interrogator.

By operating as wavelength selective mirrors, FBGs reflect a single specific wavelength of light and transmit all others, and the wavelength reflected by the FBG is referred to as the Bragg wavelength. When an FBG (and the optical fiber in which it is located) is stretched, compressed, and/or undergoes changes in temperature, the Bragg wavelength (i.e., the reflected wavelength) changes. The interrogator—using a demodulation technique—can observe this change in the wavelength and translate it into strain, phase and/or temperature measurements based on the relationship between mechanical strain, phase, twist, temperature change, and the resulting Bragg wavelength. Notably, FBGs have inherent sensitivity to both mechanical strain and temperature change, so it is not just the thermal expansion (mechanical) which gives sensitivity to temperature, but also some optical properties change as well, which have an effect on the Bragg wavelength. FBGs are sensitive to twist through the inherent sensitivity to strain. In an interrogation system that uses OFDR, each array of FBGs contained within a single fiber may require a single reference reflector located on a second fiber "arm" whereby the single fiber gets split into two fibers such that one of the two splits contains the array of FBGs and the other split arm contains a single reference reflector. This setup would then be copied for each array which must be interrogated, such as each individual sensing fiber contained in a 3-dimensional (3D) shape sensing bundle or a multi-fiber bundle (an MFB).

Both scattering and FBG technologies use various demodulation techniques-used to obtain and make calculations with the optical signal provided by the sensors—with wavelength division multiplexing (WDM) being the most common for FBG-based optical sensors. However, OFDR offers significant advantages over WDM in many circumstances, primarily because OFDR technology can utilize an order-of-magnitude more sensors on a single fiber than WDM. Optical time domain reflectometry (OTDR) may also provide advantages in certain circumstances.

In WDM systems each FBG must reflect a different Bragg wavelength. Because laser light includes only a finite number of distinguishable wavelengths, WDM systems are limited to the number of sensors they can interrogate on a single fiber. Furthermore, in WDM the range of potentially reflected wavelengths for each FBG cannot be too close to those used by another FBG in the same optical fiber because one FBG under strain could shift so much as to reflect the same wavelength as another grating (strained or unstrained) and thereby render the data indistinguishable as to the FBG source (making the data unusable).

In contrast, in OFDR systems each FBG reflects the same wavelength where the return reflections are measured for changes in wavelength as a function of modulation frequency and that can be plotted as indicators of fiber length corresponding to the locations of each FBG (even among a continuous array of FBGs). In this manner, OFDR is able to provide spatially continuous information along one or more fibers (while WDM cannot), making OFDR well-suited for applications that require spatially continuous monitoring of strain, phase, temperature, stress, distributed loads, twist and/or shape-changes in real-time. And because OFDR allows each FBG to reflect the same wavelength, there is no limit on the total number of FBG sensors incorporated into an optical fiber (enabling continuous arrays of FBGs) that are used to provide spatially continuous measurements along the optical fiber. Indeed, the measurement distance for such FBG sensors is only limited by the coherence length of the tunable light source.

Accordingly, one approach for achieving continuous measurements using an optical fiber (e.g., to collect fully distributed strain, phase and temperature data) is to inscribe FBGs continuously along the entire length of the optical fiber. The FBGs must be incorporated into the core of the optical fiber when the optical fiber is manufactured or written through the coating post-manufacturing. The FBGs then act as miniscule mirrors in the core of the optical fiber. As a light-based signal travels down the optical fiber, each FBG reflects a portion of the signal back to the system. The system recognizes changes in the returning signal and makes calculations with this information to provide accurate strain, phase and temperature measurements. As such, when an FBG optical fiber is bonded to a material and interrogated with light, the FBGs will reflect different wavelengths and phase as the fiber is strained concurrent with the material onto which it is bonded.

Fiber optic position and/or shape sensing devices generally include a multicore optical fiber for determining position and shape of an object. Multicore optical fiber includes two or more cores within a common cladding, positioned in relative relationship to one another, and spaced apart from each other to reduce mode coupling (i.e., distortions) between the fiber cores. Such devices further include an interrogator that transmits light to, and receives reflected light from, the multicore optical fiber.

An MFB such as a multi-fiber shape sensor bundle is a helically twisted bundle of at least three single-core optical fibers wrapped around a single-core central fiber. Such an MFB can be used when calculating MFB twist distribution data along a MFB using OFDR phase interrogation data.

The bundle may be rigidly bonded with an adhesive to form a unitary multi-fiber bundle ("rigidly" meaning where all fibers in the multi-fiber bundle deform together due to a change in position or shape). In this MFB configuration- and because each fiber has its own core, cladding, and coating—the fiber cores are spaced apart and separated from each other such that mode coupling between the fiber cores is substantially eliminated. By definition, in structure, in operation and in output, an MFB and a MOF are very different.

An interrogator may be coupled to each individual optical fiber in order to obtain data associated with each of the multiple fiber segments of each individual optical fiber and, collectively, all of the fiber segments of all of the optical fibers. This data, in turn, can then be used to determine a strain parameter and/or phase signal for the core of each of the multiple fiber segments and, based on predetermined baseline strain parameters for each fiber in the multi-fiber bundle, information regarding shape (including position and bend as well as twist) of a portion of the multi-fiber may also be determined. These determinations, in turn, enable the strain parameters and/or phase signals to be converted into local shape measurements defining shape in the multi-fiber bundle at a particular location along the bundle that represent a change in position, bend, or twist. A particular side effect and enhanced benefit to the MFB is that it can be used to get a larger twist signal in a different way compared to the traditional straightforward approaches (such as those based on MOF designs). The interrogator may be part of an optical network.

FIG. 1 illustrates a representative shape sensing device (SSD) 100 for calculating MFB twist distribution data along the MFB using OFDR phase data of the interrogation data. In FIG. 1, the shape sensing device 100 includes an MFB 120 operationally coupled to an interrogator 110 (reflectometer) via an integrated connection interface (ICI) 112. In a general sense, the interrogator 110 may include a laser and an optical network. The interrogator 110 may also include an OFDR, an OTDR, or both (among other options such as those based on WDM for example), and/or any other device suitable for processing light signals received from the MFB 120 to produce interrogation data with regard to shape sensing as known and appreciated by skilled artisans. The interrogator 110, in turn, may be operationally coupled by coupling 123 to a special-purpose computing system 140 capable of making calculations with the interrogation data to determine position, bend, and/or twist of the MFB and/or presenting this information to an end-user. The components of SSD 100 other than system 140 may be or be part of an optical network.

With specific regard to the interrogator 110, optical transduction may be utilized that involves monitoring the reflected FBG signal and correlating that information to strain, phase and/or temperature. Changes in the FBG length and optical properties due to changes in strain and/or temperature result in changes to the Bragg wavelength and phase of the FBG. In this manner, mechanical strain and temperature can be measured directly-based on changes to the Bragg wavelength and/or phase of the FBG- and various temperature compensation techniques can then be employed to decouple these measurements.

In FIG. 1, MFB 120 further includes a helically-twisted 132 main section 122 for shape sensing (including detecting shape, position, bend, and/or twist), an interrogator-side unbonded section 124 for coupling to the integrated connection interface (ICI) 112, and a terminal portion 126 constituting the terminus of the main section 122 and the MFB 120 opposite the unbonded section 124. The coupling of 124 to ICI 112 may be a direct connection or a connection through a coupling point. The MFB may also include optional boundary reinforcement 121 at the boundary between the helically-twisted 132 main section 122 and the unbonded section 124. As shown in FIG. 1, the main section 122 may include single-core optical fibers 128, and these optical fibers 128 may be rigidly bonded such that all fibers in the MFB 120 deform together due to a change in position, shape, bend or twist of the MFB 120.

The MFB 120 may include a set of seven single-core optical fibers 128 and these single-core optical fibers 128 may be arranged such that, from the boundary between the rigidly bonded helically-twisted main section 122 and the unbonded section 124 to the terminal portion 126, one fiber runs linearly through the center of the MFB 120 while the remaining six fibers are helically twisted 132 around and bonded to the center fiber.

The use of Bragg gratings, Bragg wavelengths, strain and temperature for generating interrogation data of an MFB can each be used to calculate curvature, bending direction and twist of the MFB. In some cases, phase can be used in addition to these techniques, and replace a very small subset of the calculations within strain to calculate twist of an MFB. Phase can be calculated from the same optical interrogation data as strain, but they can be and use separate calculations. Strain or phase data can be used to calculate curvature, bending direction and twist of the MFB.

Interrogator 110 and/or system 140 may be for or be part of a system for calculating MFB twist distribution data along an MFB using OFDR phase data of interrogation data. This calculating may be or include measuring and/or determining MFB twist distribution data along a multi-fiber 3D shape sensor bundle using OFDR phase interrogation data. Also, MFB 120 or other MFBs herein may be considered a 3D shape sensing bundle or a 3D MFB shape sensor.

System 100 may be a fiber optic shape-sensing system having optical fibers helically twisted and rigidly bonded to form a linearly-running MFB 120 for calculating position, bend and twist of the shape-sensing MFB 120, wherein each optical fiber has a single core. Interrogator 110 is operationally coupled to MFB 120 and is for transmitting light to, and receiving reflected light from the MFB 120 to produce interrogation data. Interrogator 110 includes inputs each of which is operationally coupling with each of the optical fibers of MFB 120. Computing system 140 is operationally coupled to the interrogator 110 and is for calculating MFB twist distribution data along the MFB using OFDR phase data of the interrogation data. Calculating the MFB twist distribution data may include making calculations with the phase difference data of each of the optical fibers over time using the OFDR phase data to determine the MFB twist distribution data. Calculating the MFB twist distribution data might not include calculating position or bend using the phase difference data of the interrogation data. The OFDR difference phase data might not include intensity, polarization, wavelength or transit time of light in each of the optical fibers; or calculating might not include using interrogation data having intensity, polarization, wavelength or transit time of light for the optical fibers. Interrogator 110 may be configured to produce the OFDR interferometric interrogation data using a laser that scans a frequency range into the MFB, which is a multi-fiber 3D shape sensor bundle. MFB 120 can be integrated into a guidewire that is configured to be registered to and visualized with anatomical imaging to display in real-time a location and shape of the guidewire within a patient; and the location and shape may be used for feedback control of robotically controlled medical devices.

An array of FBGs can be disposed within the core of each single-core optical fiber from among the single-core optical fibers, where: a) at least a subset of FBGs from among the FBGs in at least one optical fiber from among the optical fibers overlaps a subset of gaps between FBGs from among the FBGs in at least one other optical fiber from among the optical fibers, b) at least a subset of FBGs from among the FBGs in each optical fiber from among the optical fibers overlaps a subset of gaps between FBGs from among the FBGs for each of the other optical fiber from among the optical fibers in the shape-sensing bundle, or c) the array of FBGs disposed within the core of each single-core optical fiber comprises a single elongated FBG running the entire length of a shape-sensing region of the shape-sensing bundle. The optical fibers may comprise at least seven optical fibers with a first fiber running linearly and six other optical fibers helically twisted around and rigidly adhered to the first fiber, and the first optical fiber remains centrally-positioned with respect to the six other optical fibers. The optical fibers may have at least three optical fibers that are helically twisted around each other to form a triple-helix strand running linearly.

Device 100, interrogator 110 and/or system 140 can calculate MFB twist distribution data along the MFB using OFDR phase data of the interrogation data, such as using a subnetwork of device 100 or interrogator 110. The MFB twist distribution data or distributed twist may be or include the cross sectional rotation of the sensor due to torsional deformation relative to an initial, untwisted state. This MFB twist distribution data may be a calculation along part of or along the entire length L of FIG. 1's main section 122 for shape sensing. It may exclude the interrogator-side unbonded section 124.

Device 100, interrogator 110 and/or system 140 can be used to receive optical radiation at a first coupling point of an optical subnetwork of interrogator 110 for at least partially removing birefringence from a subnetwork measurement arm. Removing may be done at a location of this subnetwork at which polarization fading effects are reduced and birefringence effects are mitigated. At the location, polarization fading effects are minimized and birefringence effects are maximally mitigated. Removal of birefringence may include minimizing polarization fading effects and maximally mitigating birefringence effects.

Figure 2A:
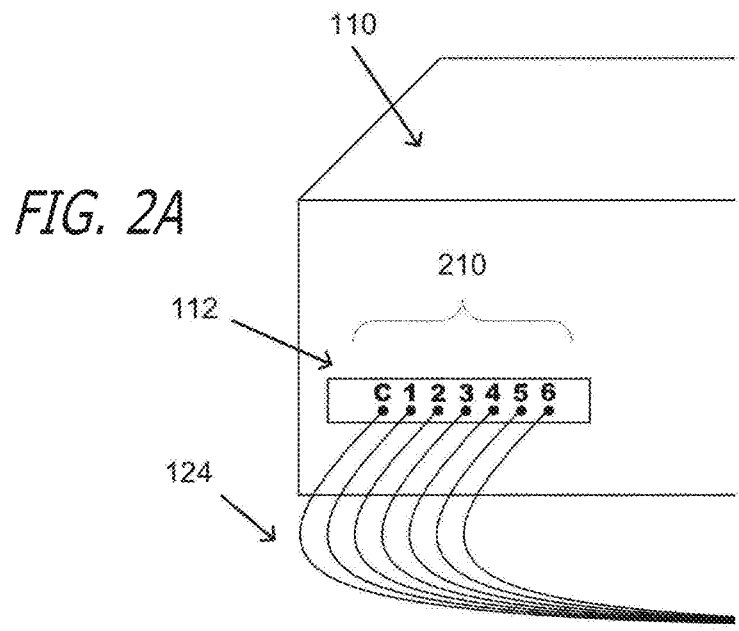
FIG. 2A illustrates the integrated connection interface (ICI) of the interrogator shown in FIG. 1.

FIG. 2A illustrates the ICI 112 of the interrogator 110 shown in FIG. 1. In FIG. 2A, the ICI 112 includes optical fiber engagement points 210 where each point is capable of operationally coupling with the core of a single-core optical fiber. Each engagement point 210 may be designated for a specific single-core optical fiber from unbonded section 124 of the MFB 120, and may also be designated or labeled accordingly such that, for example, the engagement point for the central-running optical fiber might be labeled as "C" while the six other points corresponding to the other six optical fibers helically twisted and surrounding the central-running optical fiber may be numbered, by way of example, in a clockwise fashion as "1", "2", "3", "4", "5", and "6" accordingly (in reference to the MFB 120 illustrated in FIG. 2B and described below). Moreover, the ICI 112 may further include an additional engagement point (not shown) for interfacing with an additional single-core optical fiber or other sensor for temperature determinations along the MFB 120 or for other purposes (described later herein). The connection point (e.g., of section 124 to ICI 112) may also be a single connector that contains all individual connections in a single interface. In some case, Multi-fiber Push On (MPO) connectors, Multi-fiber Termination Push-on (MTP) connectors, multiple dual-fiber SN (e.g., SN® (Senko Nano) Push-Pull-Boot Duplex plug connectors) fiber connectors may be linked together into the single connector.

Figure 2B:
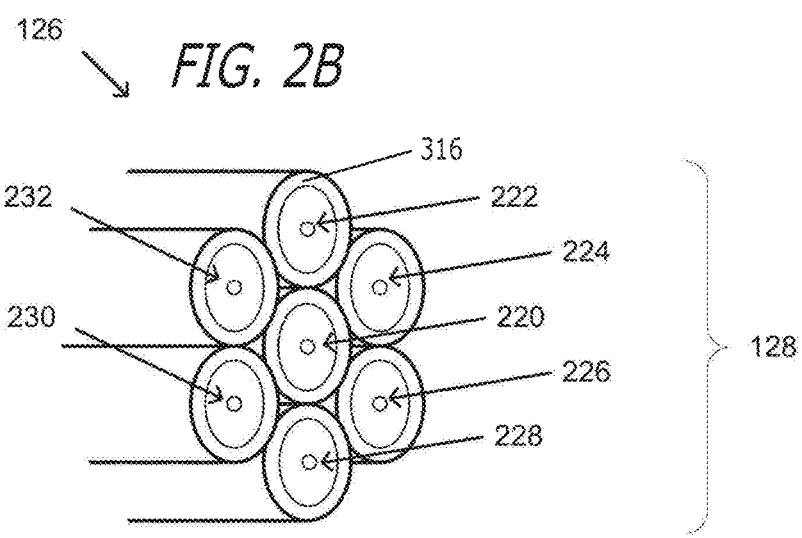
FIG. 2B illustrates the terminal portion of the main section of the multi-fiber bundle (MFB).

FIG. 2B illustrates the terminal portion 126 of the main section 122 of the MFB 120 providing a representative cross-section of the MFB 120. In FIG. 2B, the MFB 120 includes optical fibers 128 which are shown to be seven single-core optical fibers including one central optical fiber 220 running linearly through the MFB 122 and enclosed within the other six additional optical fibers 222, 224, 226, 228, 230, and 232, the latter of which (as shown in FIG. 1) are helically twisted 132 around the central-running optical fiber 220.

Figure 3A:
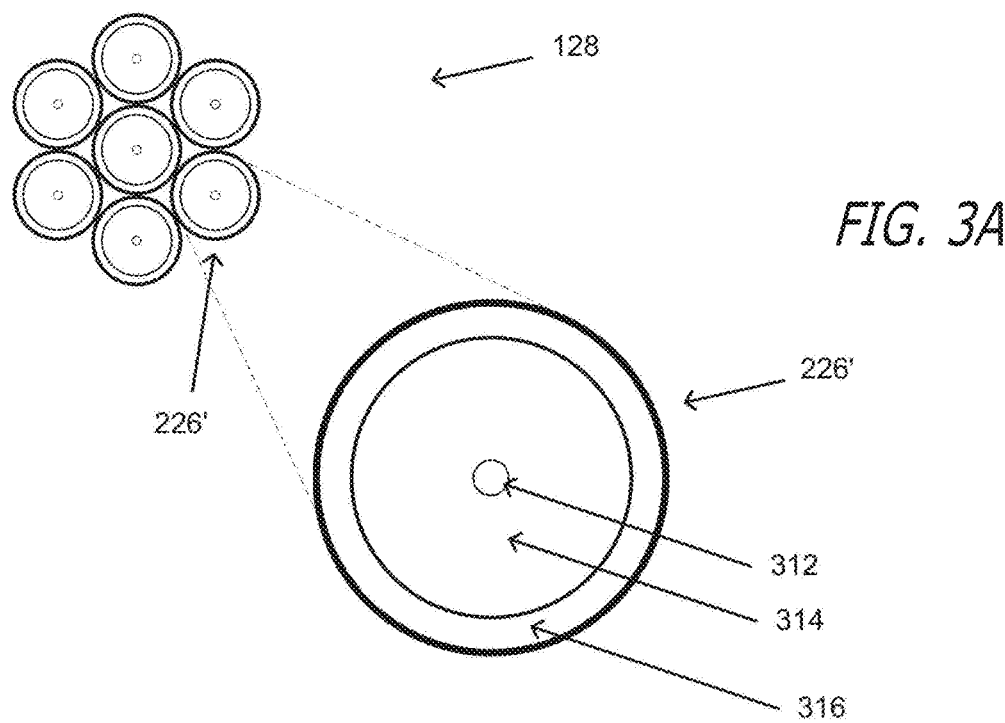
FIG. 3A illustrates the composition of a single-core optical fiber.

FIG. 3A illustrates the composition of a representative single-core optical fiber 226' from among the optical fibers 128 including the main section 122 of the MFB 120. In FIG. 3A, the single-core optical fiber 226' includes a core 312, cladding 314, and a coating 316. The core and cladding may be both made from silica glass, although the optical properties of each differ. Specifically, the refractive index of the core—which describes the speed at which light travels through a material—is slightly increased during the manufacturing process in order to form the waveguide that enables light to be transmitted over long distances in the core with very low attenuation. The outermost layer, the coating, is applied to the outside of the cladding to increase the robustness of the fiber while protecting the exterior of the cladding from mechanical damage and contaminants, such as dirt and moisture. For strain and/or phase sensing applications, this coating must be sufficiently stiff in order to provide a load path for strain to transfer into the core. These three primary layers of the optical fiber structure are depicted in FIG. 3A. For additional environmental protection, fiber may be encased within auxiliary buffer tubes or jackets to form a fiber optic cable, otherwise known as a "patch cord". In a typical patch cord, the optical fiber is packaged in a tight buffer jacket and loosely incorporated into an outer jacket filled with strength members such as Kevlar® strands.

Figure 3B:
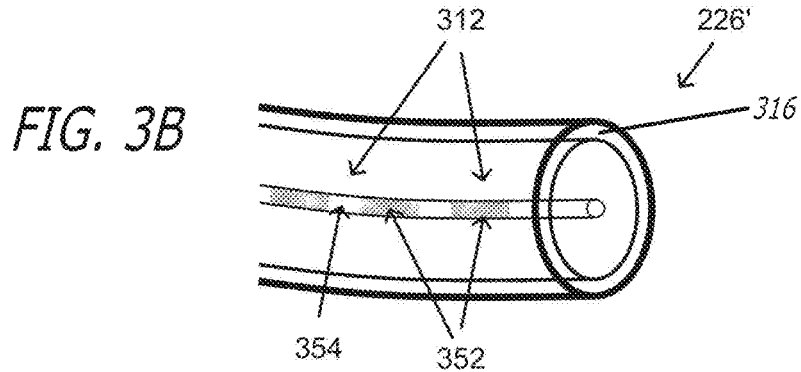
FIG. 3B further illustrates the composition of a single-core optical fiber.

FIG. 3B further illustrates the composition of a representative single-core optical fiber 226' from among the optical fibers 128 including the main section 122 of the of the MFB 120. In FIG. 3B, the core 312 of the single-core optical fiber 226' further includes FBGs 352 separated by inter-FBG gaps 354.

Referring now to FIG. 4, there is shown a schematic embodiment of an optical network 400 which includes optical network 410 and the MFB 420. The optical network 410 may be or include the interrogator 110 and the MFB 420 may be or include MFB 120 of FIG. 1. The optical network 400 has a number of optical devices interconnected with optical fibers. In general, the lengths of fiber are selected so that reflections move into an area of the OFDR reflection spectrum data where they will not interfere with the desired data. The lengths of fiber may also be selected such the reflections from the MFB 420 appear in a desired section of the OFDR reflection spectrum data. A laser 415 sends a laser light signal to isolator 418 which may isolate laser light from laser 415 as a passive device that allows isolated light to pass through in one direction towards splitter 425 while blocking light in the opposite direction back from splitter 425, thus reducing back reflections in the laser optical fiber and reducing backscattering of light which may be highly desirable. Light from isolator 418 continues to 1×2 splitter 425 which splits that light and sends split light to clock network 415 and 1×4 splitter 430. Splitter 425 splits light received from isolator 418 into two fibers to network 415 and 1×4 splitter 430. This particular splitter may not split with even amplitude. The split amplitude may be with 70 to 95% going to the 1×4 splitter and 30 to 5% going to the clock network. One arm of the laser light from splitter 425 is sent to network 415 to create a clock signal at clock photodiode (PD) 405. Clock network 415 is a clock subnetwork which modulates the signal received from splitter 425, and this modulated signal is sent to the clock photodiode PD 402 to create a clock signal for network 400 and System PDDs 450. The signal received at clock PD 405 can be used to control the timing for sampling the OFDR data with the data acquisition system. The clock photodiode (PD) 405 may receive timing signals in the form of modulated optical radiation through a subnetwork such as a clock network 415 which provides appropriate sampling timing to the system/photo diodes (PDDs) 450.

The other arm of the laser light from splitter 425 is sent by the 1×2 splitter 425 to be distributed by splitter 1×4 430 into 4 split signals which are each modified (e.g., by probes 1-4) to appropriately interrogate the MFB 420. The laser light from splitter 1×2 125 is split by a 1×4 splitter 430 into a channel subnetwork 460 having four optical subnetworks that include respective probes 441, 442, 443, 444. MFB 420 may be MFB 120. Probes 441-444 are optically connected to and output light signals to optical fibers 428a-d, respectively, which are each a fiber 128. Although 4 probes and fibers are shown there can be various number of both, such as for the 7 fibers previously shown. Each subnetwork of subnetworks 460 and/or probe 441-444 of network 400 may be part of MFB 120 or of a fiber 128 of that MFB. Each subnetwork of subnetworks 460 may be part of network 110 and each of probes 441-444 may be part of MFB 120, such as by being a fiber 128 of that MFB. Probes 441-444 are also optically connected to and output light signals to system/photo diodes (PDDs) 450, such as by fibers. Although 4 fibers are shown there can be various numbers, such as for the 7 fibers of fibers 128 previously shown.

Figure 5:
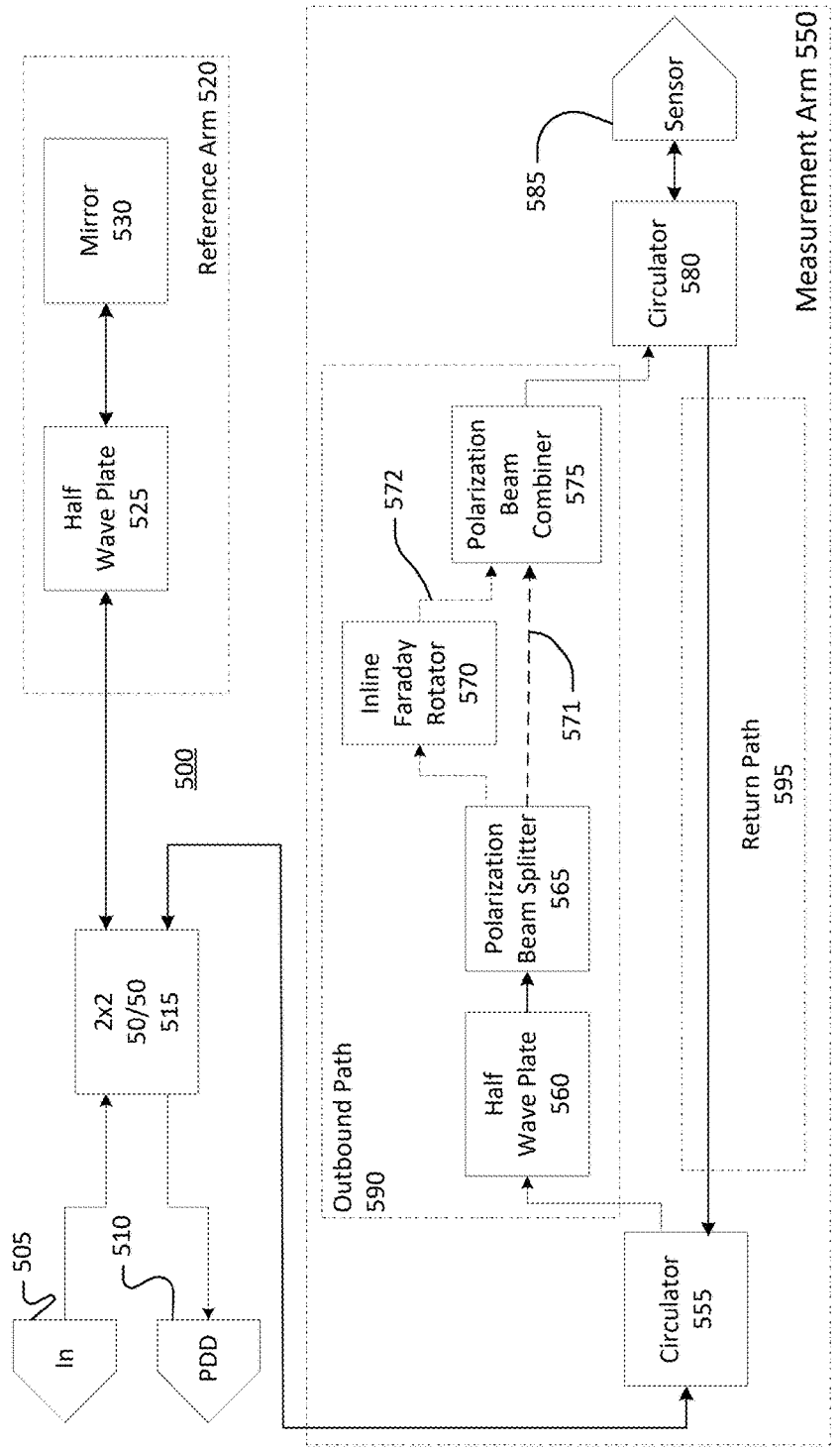
FIG. 5 is a schematic embodiment of an optical subnetwork having birefringence mitigation.

Referring now to FIG. 5 there is shown a schematic embodiment of an optical subnetwork 500 having birefringence mitigation. The optical subnetwork 500 may be representative of or part of the four optical subnetworks of FIG. 4 which make up the network 110, a channel of subnetwork 460, each of probes 1-4 and/or MFB 420. The optical subnetwork 500 may be representative of each of probes 441-444 such as where splitter 515 receives light from a channel (e.g., 1 of the 4) of 1×4 splitter 430 (not shown in FIG. 5) that was sent by light from laser 415 (not shown in FIG. 5) through isolator 420 (not shown in FIG. 5) to subnetwork 460 (not shown in FIG. 5) for one of the probes 1-4. That is, input 505 may be the light from a channel of splitter 430 to a probe 1-4, PDD 510 may be a received channel of output at PDD 450 from a probe 1-4, and sensor 585 may be a probe 1-4 channel to/from a fiber 428a-d of MFB 420. Subnetwork 500 may represent one of 4 channels as in FIG. 4, 7 channels as in FIG. 1-3B, or another number of channels or fibers. The various optical devices within the optical subnetwork 500 are interconnected with SM fiber segments, such as either polarization insensitive or polarization-maintaining (PM). SM can be polarization insensitive segments which do not maintain light polarization and/or polarization maintaining (PM) fiber segments can be segments that do maintain polarization of light. All fiber segments with FIG. 5 are polarization insensitive unless otherwise stated (such those shown with solid lines), and the PM segments are shown in FIG. 5 as dashed lines. The optical subnetwork 500 may include delay elements (not shown) to achieve appropriate timing of signals at given points within the optical subnetwork 500.

An input 505 provides laser light provided by the 1×4 splitter 430 (FIG. 4). The signal input 505 is connected or coupled to a 2×2 splitter 515. The 2×2 splitter 515 is a connection point which divides the laser light from the input 505 to a reference arm 520 and a measurement arm 550. In some cases, the split is even in amplitude. In other cases, it is not. The 2×2 splitter 515 also combines optical radiation back from the reference arm 520 and the measurement arm 550, and provides this combined optical radiation to a polarization diversity detector (PDD) 510 which converts the optical radiation into electrical signals which themselves are used to produce interrogation data. This is the same interrogation data described above with respect to FIG. 1.

The reference arm 520 produces a reference signal with which a measurement signal from the measurement arm 550 is superimposed. The reference arm 520 has a half wave plate 525 and a mirror 530. Optical radiation from the 2×2 splitter 515 passes through the half wave plate 525 and then is reflected back by the mirror 530. The half wave plate 525 rotates the state of polarization of the optical radiation travelling through the reference arm 520 such that the incident signal on the PDD 510 is optimized. The half wave plate 525 is used to evenly split the reflected optical power from the reference arm 520 across the two orthogonal polarization states that are received by the PDD 510. PDD 510 may be designed to receive two or more polarization orientations, and the half wave plate 525 may be used to maximize power reflected from reference arm 520 across all polarization orientations of the PDD 510.

The measurement arm 550 is distinct from the reference arm 520. The combination of the measurement arm 550 and the reference arm 520 and the splitter 515 between them collectively make up or include a Michelson interferometer. The measurement arm 550 includes an outbound path 590 and a return path 595 connected by respective optical circulators 555, 580 on either end.

The outbound path 590 is for sending optical radiation from the input 505 to a sensor 585 and has a number of optical devices 565, 570, 575 which reduce polarization fading effects and enable birefringence mitigation. In the outbound path 590, the polarization of the optical radiation is delayed and rotated. Delay may be achieved by providing an appropriate length of fiber in the segment. The outbound path contains two subpaths such as shown at segments 571 and 572, created by the PBS 565, and recombined in the PBC 575. In one of these subpaths such as shown at segments 572, the signal is delayed and the state of polarization is rotated at rotator 570 relative to the other sub path such as shown at segments 571. The outbound path 590 includes a first optical device 560 such as a half wave plate which rotates polarization of the optical radiation from the circulator 555. A second optical device 565 such as a polarization beam splitter then splits the polarization-rotated optical radiation into a first polarization maintaining segment 571 and into a second segment 572 which delays and further rotates polarization of the optical radiation using, for example, an inline Faraday rotator 570. Instead of a Faraday rotator there may be a circulator and a Faraday mirror. The first optical device 560 may be outside of the outbound path 590, such as between the 2×2 splitter 515 and the circulator 555.

Rotator 570 may rotate the polarization of light in segment 572 to be orthogonal the polarization of light in segment 571. That is, light in segment 572 may be rotated to have polarity that is 90 degrees different than or at a right-angle as compared to light in segment 571. Rotator 570 may rotate the polarization of segment 572 by 90 degrees or 270 degrees as compared to 0 or 180 degrees of segment 571. In some cases, the polarization maintaining optical segment 572 is for rotating a polarization of the optical radiation received from splitter 565, and polarization maintaining optical segment 571 is for maintaining the polarization of the optical radiation received from splitter 565. In some cases, the polarization maintaining optical segment 572 is for rotating the polarization of the optical radiation received from splitter 565 an arbitrary number of times such that it is orthogonal to the state of polarization in the polarization maintaining optical segment 271, in this case, the polarization maintaining optical segment 571 may also rotate the polarization of the optical radiation (e.g., by a rotator or rotators not shown). In some cases, there are two rotations on the segment 572 path, and one on the segment 571 path, such that they are still orthogonal" relative to each other, but both see an initial and identical rotation. This can be expanded to be one arm 571 having N rotations (faraday mirrors/in line rotators), and the other arm 572 having N+1. For this case, FIG. 5 shows where N=0.

A third optical device 575 such as a polarization beam combiner then combines the optical radiation from the first polarization maintaining segment, having a first state of polarization, and from the second segment, having a different state of polarization, and one path being delayed relative to the other, for transmission to the sensor 585. The outbound path 590 is therefore a location at which polarization fading effects are reduced and birefringence effects may be mitigated. For example, the phase of the signal at a location of the return path 595 may be adjusted based on data from the PDD 510, sensor 585 or both. In other cases, the phase of the signal at a location of another fiber, path or segment of arm 550 may be adjusted based on data from the PDD 510, sensor 585 or both to reduce polarization fading effects and mitigate birefringence effects. The adjustment may be made by interrogator 110 and/or system 140 using that data. Furthermore, within the outbound path 590 polarization fading effects may be minimized and birefringence effects may be maximally mitigated.

In some cases, outbound path 590 generates OFDR interrogation data that can be used to mitigate polarization fading effects and birefringence effects through additional calculations. In this case, the effects are not mitigated by the network design alone. The network generates the data that can be processed such that they are mitigated, such as by interrogator 110 and/or system 140.

The return path 595 receives optical radiation from circulator 580 which receives it from combiner 575, and path 595 passes that received optical radiation to the PDD 510. Circulator 580 receives optical radiation from combiner 575, sends and receives radiation from combiner 575 to and from the MFB sensor 585, and then sends the light received from the MFB sensor 585 to the PDD 510. In some cases, the return path 595 receives optical radiation from the sensor 585 and also passes that received sensor optical radiation to the PDD 510. The return path 595 is a polarization insensitive single mode fiber segment between the two optical circulators 555, 580.

The optical subnetwork 500 may be or be part of the interrogator 110, such as where input 505 is from the laser (e.g., light goes from laser 415 to the 1×2 splitter 425 then to the 1×4 splitter 430 then to 2×2 splitter 515 of subnetwork 500), and the sensor (e.g., MFB 120 or 420) connects to the subnetwork 500 between 580 and 585. Input 505 may be from the laser 415 that goes from the laser through the 1×2 splitter 425 then through the 1×4 splitter 430 as part of subnetwork 500. The sensor may connect to the subnetwork between 580 and 585. Subnetworks of networks 400 and 500 may be or be part of an optical network and/or be part of the interrogator 110 and of the MFB 120 of FIG. 1. For example, splitter 430 or another splitter may split signals from splitter 515 as input 505; circulator 580 may circulate signals to and from the probes or fibers of the MFB 420 as or as well as sensor 585; and PDD 510 may be one channel of input to PDD 450. The PDD 510 and/or PDDs 450 may be part of interrogator 110 or an OFDR system, such as for feeding their data to system 140 for adjusting the polarization and/or delays of the signal at a location of a fiber, path or segment of arm 550 based on that data to reduce polarization fading effects and mitigate birefringence effects.

Interconnections of FIGS. 4-5 may be optical connections. They may be direct connections without other optical devices in between. In other cases, they are optical couplings that may have other optical devices not shown in between that do not change the functions or descriptions herein.

Figure 6:
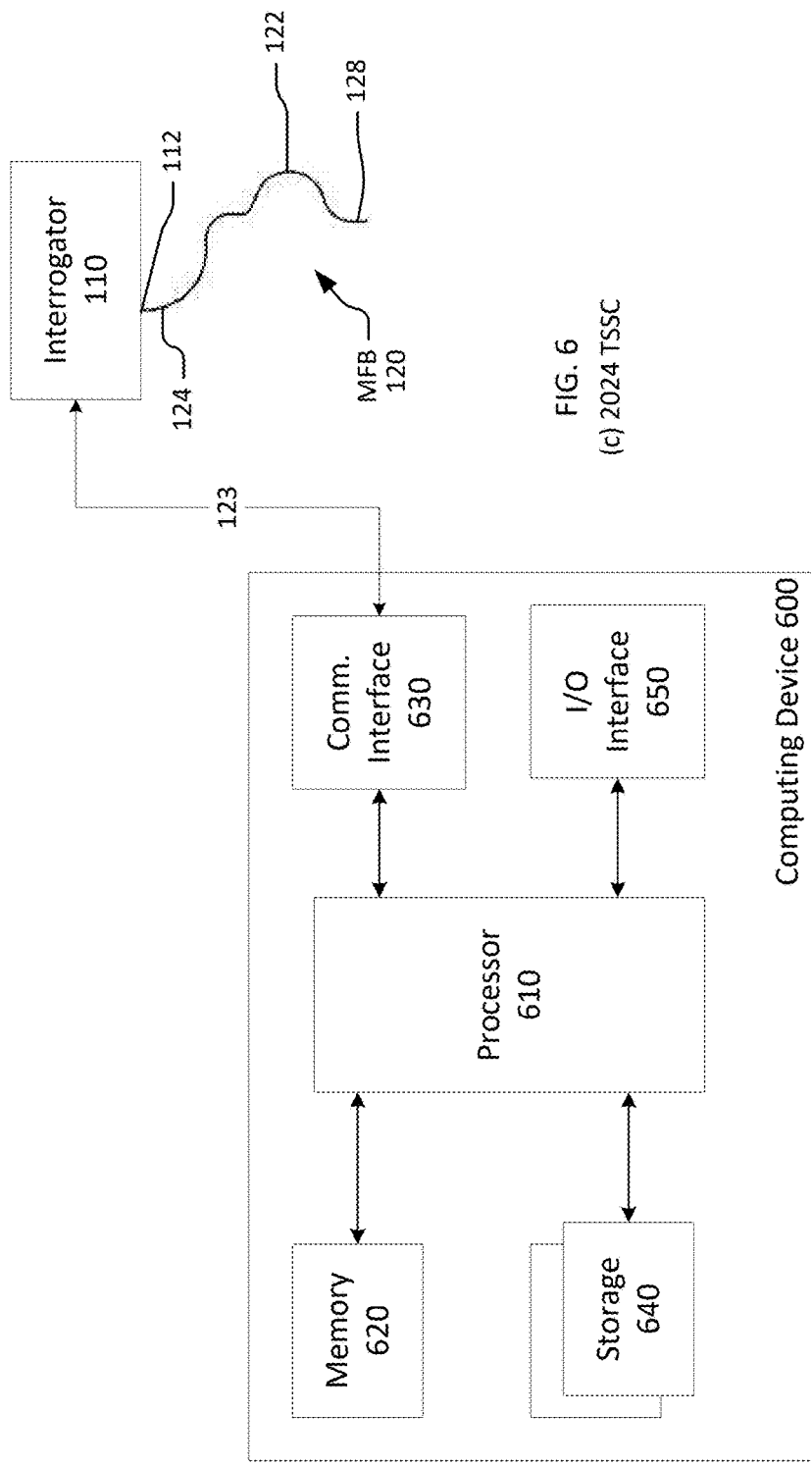
FIG. 6 is a block diagram of an exemplary computing device or environment.

FIG. 6 is a block diagram of a computing device 600 or environment that may be used in conjunction with examples and embodiments disclosed herein. Device 600 may be or be a part of interrogator 110 and/or of system 140. As shown in FIG. 6, the computing device 600 includes a processor 610, memory 620, a communications interface 630 coupled to interrogator 110 which is connected to MFB 120, along with storage 640, and an input/output interface 650. MFB 120 operationally coupled to interrogator 110 via an integrated connection interface (ICI) 112 which may be or include comm interface 630.

The processor 610 may be or include one or more microprocessors, microcontrollers, digital signal processors, application specific integrated circuits (ASICs), or a systems-on-a-chip (SOCs). The memory 620 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 620 may store software programs and routines for execution by the processor, such as for dynamically transitioning of a simulating host of a portion or all of network interactive environments. These stored software programs may include an operating system software. The operating system may include functions to support the input/output interface 650, such as protocol stacks, coding/decoding, compression/decompression, and encryption/decryption. The stored software programs may include an application or "app" to cause the computing device to perform portions of the processes and functions described herein, such as the process of dynamically transitioning of a simulating host of a portion or all of network interactive environments. The word "memory", as used herein, explicitly excludes propagating waveforms and transitory signals. The application can perform the functions described herein.

Connections of communications interface 630 to and from interrogator 110 are shown. The communications interface 630 may include one or more wired interfaces (e.g. a universal serial bus (USB), high definition multimedia interface (HDMI)), one or more connectors for storage devices such as hard disk drives, flash drives, or proprietary storage solutions. The communications interface 630 may also include a cellular telephone network interface, a wireless local area network (LAN) interface, and/or a wireless personal area network (PAN) interface. A cellular telephone network interface may use one or more cellular data protocols. A wireless LAN interface may use the Wi-Fi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol. The cellular telephone network interface and/or the wireless LAN interface may be used to communicate with devices external to the computing device 600.

The communications interface 630 may include radio-frequency circuits, analog circuits, digital circuits, one or more antennas, and other hardware, firmware, and software necessary for communicating with external devices. The communications interface 630 may include one or more specialized processors to perform functions such as coding/decoding, compression/decompression, and encryption/decryption as necessary for communicating with external devices using selected communications protocols. The communications interface 630 may rely on the processor 610 to perform some or all of these functions in whole or in part.

Storage 640 may be or include non-volatile memory such as hard disk drives, flash memory devices designed for long-term storage, writable media, and proprietary storage media, such as media designed for long-term storage of data. The word "storage", as used herein, explicitly excludes propagating waveforms and transitory signals.

The input/output interface 650 may include a display and one or more input devices such as a touch screen, keypad, keyboard, stylus or other input devices. The processes and apparatus may be implemented with any computing device. A computing device as used herein refers to any device with a processor, memory and a storage device that may execute instructions including, but not limited to, personal computers, server computers, computing tablets, set top boxes, video game systems, and telephones. These computing devices may run an operating system, including, for example, variations of the Linux, Microsoft Windows, and Apple Mac operating systems.

The techniques may be implemented with machine readable storage (e.g., non-transitory) media in a storage device included with or otherwise coupled or attached to a computing device 600, such as, when executed, for performing dynamically transitioning of a simulating host of a portion or all of network interactive environments. That is, the software may be stored in electronic, machine readable media. These storage media include, for example, magnetic media such as hard disks, optical media such as compact disks (CD-ROM and CD-RW) and digital versatile disks (DVD and DVD+RW), flash memory cards and other storage media. As used herein, a storage device is a device that allows for reading and/or writing to a storage medium. Storage devices include hard disk drives, DVD drives, flash memory devices, and others.

Device 600, interrogator 110 and/or system 140 may each be or include an apparatus having a non-transitory machine readable medium storing a program having instructions which when executed by a processor will cause the processor to perform the actions, function and/or processes described herein, such as to measure MFB twist distribution data along a multi-fiber shape sensor bundle using OFDR phase interrogation data.

The computing system environment is only one example of a suitable computing environment and is not intended to suggest any limitation as to the scope of use or functionality. As for replacing device 600, numerous other general purpose or special purpose computing system environments or configurations may be used, including those implementing cloud and artificial intelligence (AI). Examples of well-known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, and so forth that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

Figure 7:
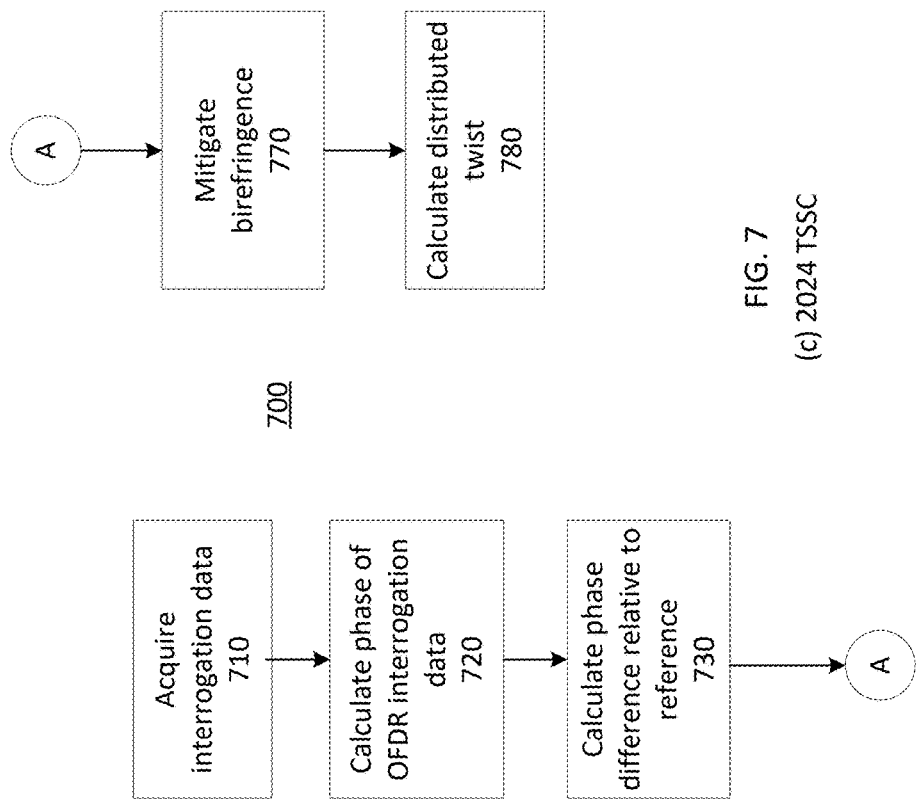
FIG. 7 is a flow chart of a process flow for calculating MFB twist distribution data along an MFB.

FIG. 7 is a flow chart of a process flow 700 for calculating MFB twist distribution data along a multi-fiber shape sensor bundle using optical frequency domain reflectometry phase interrogation data. Flow may also be for birefringence mitigation. Process 700 may be performed by device 600, interrogator 110 and/or system 140. The process 700 starts at step 710 and ends at step 780, but the process may be cyclical in nature, such as by returning to step 710 or 720 after step 780. Certain steps may not be shown in flow 700. Flow 700 may measure, determine or calculate the MFB twist distribution data along the length of FIG. 1's main section 122 for shape sensing, or along the length of section 122 and section 124. The MFB twist distribution data may be a distributed twist that is or includes the cross sectional rotation of the MFB sensor due to torsional deformation relative to an initial, untwisted state. This MFB twist distribution data may be a calculation along part of or along the entire length L or FIG. 1's main section 122 for shape sensing.

Process 700 begins with step 710 at which the OFDR interrogation data is acquired from an MFB. Step 710 may be interrogator 110 and/or system 140 acquiring OFDR interferometric interrogation data for each of the fibers of MFB 120 or an MFB herein. The OFDR interrogator may use a variable frequency laser beam that is coupled to an optical interferometer. The output of a tunable laser source (TLS) is split between the reference and measurement arms of an interferometer which may be the fibers of the MFB. In the MFB fiber measurement path, the light is further split to interrogate a length of fiber under test (FUT) of MFB and return the reflected light. The reflected interference signal between the measurement and reference arms is recorded using optical detectors. The auxiliary interferometer used to trigger the data acquisition in equal optical frequency increments and a portion of the network where a gas cell is used to monitor the absolute wavelength of the tunable laser are not shown in the figure. The acquiring may include receiving light signals from the MFB and processing them to produce interrogation data.

OFDR systems can be classified in two main classes: coherent and incoherent OFDR. The OFDR herein may be either, or another applicable class. Most OFDR systems based on Rayleigh scattering are classified as coherent OFDR, while incoherent OFDR is mainly used for systems based on Raman or Brillouin scattering. The OFDR configuration can be used to detect temperature, phase, strain, beat length and high order mode coupling in optical fibers. It is an excellent choice for short sensing lengths (<100 m).

The MFB may have at least three single core radially offset fibers helically wrapped about and rigidly adhered to a central single core fiber, wherein the at least three radially offset fibers and the central single core fiber include fiber Bragg gratings (FBGs). Acquiring at step 710 may be receiving OFDR interferometric interrogation data for all of the at least three radially offset fibers and the central fiber of the MFB. The MFB may be MFB 120, or any other MFB herein. The MFB may include six single core fibers helically wrapped about and rigidly adhered to a central single core fiber. The MFB is not a multicore optical fiber (MOF).

After step 710, at step 720 current phase signal data is calculated from the OFDR interferometric interrogation data. Calculating at 720 may be extracting the current phase signal data for each of the at least three radially offset fibers and the central fiber of the MFB. Calculating at step 720 (or steps 720-730) may include the following routine for each fiber of the MFB:

1. Calculate a Fast Fourier Transform (FFT) data of the OFDR interrogation data of step 710;
2. Calculate a phase angle of the FFT data;
3. Calculate the phase angle difference relative to an initial reference state;
4. Unwrap the phase angle difference data;
5. Account for FBG gaps/correct FBG gap unwrapping discontinuities in the phase data.

In some cases, after 710 the interrogation data, or after 720 the current phase signal data does not include intensity, polarization, wavelength, or transit time of light in each of the optical fibers.

After step 720, at step 730 a phase difference of the current phase signal data is calculated relative to previously acquired reference phase signal data for the MFB. The previously acquired reference phase signal data at step 730 may be the prior phase of the fiber that the phase difference is being calculated for.

Step 730 may be calculating phase difference data that is a change in phase data between the current phase signal data and previously acquired reference phase signal data from the OFDR interferometric interrogation data, for each of the at least three radially offset fibers and the central fiber of the MFB. The step 730 phase difference calculation may be just a subtraction calculation of subtracting the previously acquired reference phase signal data from the current phase signal data.

Steps 710-730 may include monitoring over time the resulting changes in the intensity, phase, polarization, wavelength, and/or transit time of light within the fibers of an MFB herein. In some cases, steps 710-730 are only monitoring phase data. In some cases, steps 710-730 are monitoring resulting changes in phase, but not monitoring the resulting changes in the intensity, polarization, wavelength, and/or transit time of light within the fibers of an MFB herein. In some cases, steps 710-730 are monitoring resulting changes in strain and/or bend in addition to phase using the interrogation data.

After steps 710-730, at step 770 birefringence is mitigated. The optical network causes two instances, or "images" of the sensor to be present in the sampled interferometric data. The processed OFDR data from these two images is averaged to generate a birefringence (and polarization fading) mitigated result. The mitigating may include using signals from subnetwork 500, PDD 510 and/or sensor 585 as noted herein. The mitigating may include adjusting the polarization and/or delays of the light signal at a location of arm 550 as noted herein. A nonlimiting embodiment of this mitigation or design may also comprise one or more locations within the described Michelson interferometer of optical subnetwork 500 or at which the state of polarization of the light signal at that location is controlled and able to be changed for the purpose of minimizing polarization fading effects and maximizing the degree to which birefringence effects may be mitigated.

After step 770, calculating at step 780 may be or include converting units of the OFDR interferometric interrogation data to units of MFB twist distribution data. In some cases, step 780 includes calculating MFB twist distribution data along the length L of the MFB. In some cases, step 780 includes converting the bend-compensated twist phase difference distribution data from the OFDR interferometric interrogation data units to 3D twist units to calculate MFB twist distribution data for the at least three radially offset fibers (and optionally for the central fiber), or for the entire MFB.

In some cases, step 780 includes inputting the bend-compensated twist phase difference distribution data or difference between an average of all of the at least three radially offset fibers and a central fiber of an MFB into a 3D algorithm to calculate shape and/or the MFB twist distribution data along the length of the MFB. In some cases, step 780 includes inputting the MFB twist distribution data for each of the at least three radially offset fibers (and optionally for the central fiber) of an MFB into a 3D algorithm to calculate shape and/or the MFB twist distribution data along the length of the MFB. In some cases, calculating at step 780 or process 700 does not include calculating using interrogation data for, of or having intensity, polarization, wavelength, or transit time of light within the optical fibers. Calculating at step 780 or process 700 may be calculating shape of the MFB by calculating the position and orientation of every point along the MFB, which requires the calculation of twist first. Calculating at step 780 may be a single step that can be described as multiplying the bend-compensated twist-phase difference data by a scaling factor.

The MFB twist distribution data along an MFB may be or include a 3D location from the base or proximal end of the MFB main section 122 or section 124 to a twist location at the distal end or terminal portion 126 of the MFB.

In some cases, process 700 includes obtaining the gap-mitigated phase difference data of all radial offset fibers and the center fiber; then averaging the radial results, and subtracting the center fiber result. Then the bending component is removed to calculate a final result "twist-phase" distribution data along part or all of length L of the MFB.

After step 780 the shape of the sensor MFB, the MFB twist distribution data and/or a device the MFB can be integrated into (such as a guidewire) is then registered to and visualized with anatomical imaging to display in real-time the location and shape of the entire device within the patient during surgery. Shape, MFB twist distribution data and other calculated data may also be used for feedback control of robotically controlled medical devices. This shape includes or is the MFB twist distribution data along the MFB.

In some cases, step 780 and/or process 700 includes calculating MFB twist distribution data along the MFB using MFB twist distribution data of the OFDR phase data of the interrogation data. In some cases, step 780 and/or process 700 includes acquiring, measuring and/or calculating the MFB twist distribution data along an MFB while inputting a laser that scans a frequency range into the MFB.

Process 700 may be using optical sensors to monitor the changes in the intensity, phase, polarization, wavelength, and/or transit time of light within the MFB (e.g., 710-730) that result from and thus are used to determine, measure or calculate temperature, strain, twist, pressure, and other parameters (e.g., 7780).

Process 700 may be repeated over time to calculate MFB twist distribution data in each of the optical fibers over time using the OFDR phase data to determine position, bend, and/or the MFB twist distribution data along the length of the MFB.

Applications of birefringence mitigation include mitigating nonzero strain and phase measurements which result from inherent and induced birefringence effects. This technique may be used to mitigate birefringence effects stemming from inherent and induced birefringence occurring within the MFB as well as the non-sensorized lead fibers which connect the MFB to the OFDR optical network. With these nonzero strain and phase measurements being mitigated, 3D accuracy is significantly improved.

The technology herein may include OFDR optical network design for mitigating inherent and induced birefringence effects in OFDR interrogation data. The technology herein may include birefringence mitigation optical network designs for OFDR-based 3D fiber optic shape sensing.

The technology herein improves the functioning of computers and provides a specialized computing device by being or including a specialized MFB and/or interrogator 110 (and optionally system 140) capable of performing a number of steps of process 700, such as step 710 and/or birefringence mitigation, such as step 770.

Descriptions herein of being "for" doing an action may mean that they are configured to and/or adapted to perform that action, such as for calculating MFB twist distribution data along an MFB using optical frequency domain reflectometry (OFDR) phase interrogation data and/or for birefringence mitigation.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to It is claimed:

1. A device for mitigating birefringence comprising a first optical subnetwork using optical frequency domain reflectometry (OFDR) receiving optical radiation at a first coupling point, the first optical subnetwork comprising:
   a reference arm comprising a first, single mode fiber segment optically connected to the first coupling point;
   a measurement arm distinct from the reference arm optically connected to the first coupling point and comprising single mode optical segments and polarization maintaining optical segments, the measurement arm comprising:
      a first optical circulator connected to the first coupling point via a second, single mode fiber segment;
      a second optical circulator for sending optical radiation to a sensor;
      a single mode optical segment between the first optical circulator and the second optical circulator including a third, single mode fiber segment;
      an outbound path including a first polarization maintaining optical segment between the first optical circulator and the second optical circulator for rotating a polarization of the optical radiation once relative to a second polarization maintaining optical segment, and including the second polarization maintaining optical segment between the first optical circulator and the second optical circulator.

2. The device of claim 1 wherein one of:
   the first polarization maintaining optical segment is for rotating the polarization of the optical radiation, and the second polarization maintaining optical segment maintains the polarization of the optical radiation; or
   the first polarization maintaining optical segment is for rotating the polarization of the optical radiation once relative to the second polarization maintaining optical segment, and the second polarization maintaining optical segment rotates the polarization of the optical radiation.

3. The device of claim 1 wherein the outbound path comprises:
   a polarization beam splitter optically connected to the first optical circulator,
   a polarization beam combiner optically connected to the second optical circulator,
   the second first polarization maintaining optical segment connected directly to the polarization beam splitter and the polarization beam combiner,
   the first polarization maintaining optical segment connected directly to the polarization beam splitter and the polarization beam combiner and having an inline Faraday rotator for rotating a polarization of the optical radiation.

4. The device of claim 1 wherein the first optical subnetwork includes a location at which polarization fading effects are reduced and birefringence effects are mitigated.

5. The device of claim 4 wherein, at the location, polarization fading effects are minimized and birefringence effects are maximally mitigated.

6. The device of claim 1 comprising plural additional optical subnetworks having a same arrangement as the first optical subnetwork, each network receiving optical radiation at the first coupling point from a fiber of a multifiber bundle (MFB).

7. The device of claim 6 consisting of four optical subnetworks, consisting of the first optical subnetwork and three additional optical subnetworks having the same configuration as the first optical subnetwork, wherein the second optical circulator is for receiving optical radiation from the sensor; and wherein the single mode optical segment between the first optical circulator and the second optical circulator is consisting essentially of the third, single mode fiber segment.

8. The device of claim 6 comprising a shape sensing system comprising an optical network which includes the plural optical subnetworks.

9. A method for obtaining optical frequency domain reflectometry data using optical frequency domain reflectometry (OFDR) from an optical network and for mitigating birefringence, the optical network comprising plural optical subnetworks, the optical subnetworks each comprising (a) a reference arm comprising a first, single mode fiber segment optically connected to a first coupling point; and (b) a measurement arm distinct from the reference arm and comprising (i) a first optical circulator connected to the first coupling point via a second, single mode fiber segment; (ii) a second optical circulator for sending and receiving optical radiation to and from a sensor; (iii) a single mode optical segment between the first optical circulator and the second optical circulator consisting essentially of a third, single mode fiber segment; (iv) a first polarization maintaining optical segment between the first optical circulator and the second optical circulator in which the polarization of the optical radiation is rotated once with respect to a second polarization maintaining optical segment, and comprising at least the second polarization maintaining optical fiber segment; the method comprising, with respect to each of the optical subnetworks:
   acquiring OFDR interferometric interrogation data from a multifiber bundle (MFB);
   extracting current phase signal data from the OFDR interferometric interrogation data for the optical subnetworks;
   calculating a change in phase between the current phase signal data and previously acquired reference phase signal data from the OFDR interferometric interrogation data for the optical subnetworks;
   calculating a phase difference of a current phase signal data relative to previously acquired reference phase signal data for the MFB; and
   converting the compensated distribution from units of the OFDR interferometric interrogation data to units of twist to calculate MFB twist distribution data along the MFB;
   wherein birefringence is at least partially removed from the measurement arm.

10. The method of claim 9 wherein the MFB comprises at least three single core radially offset fibers helically wrapped about and rigidly adhered to a central single core fiber.

11. The method of claim 9 wherein one of:
   the first polarization maintaining optical segment is for rotating the polarization of the optical radiation, and the second polarization maintaining optical segment maintains the polarization of the optical radiation; or
   the first polarization maintaining optical segment is for rotating the polarization of the optical radiation once relative to the second polarization maintaining optical segment, and the second polarization maintaining optical segment rotates the polarization of the optical radiation.

12. The method of claim 9 wherein removal of birefringence includes minimizing polarization fading effects and maximally mitigating birefringence effects.

13. A device for mitigating birefringence comprising a first optical subnetwork using optical frequency domain reflectometry (OFDR) receiving optical radiation from a source and generating interrogation data, the first optical subnetwork comprising:
a reference arm comprising a first, single mode fiber segment receiving optical radiation from the source and generating reference data;
a measurement arm distinct from the reference path and comprising a Michelson interferometer, the measurement arm comprising:
an outbound arm for sending optical radiation received from the source to a sensor and comprising plural optical devices which reduce polarization fading effects and mitigate birefringence through a state of polarization of the optical radiation, the plural optical devices including:
a first optical device which rotates polarization of the optical radiation,
a second optical device which splits the rotated polarization optical radiation into a first polarization maintaining segment and into a second segment which further rotates polarization of the optical radiation, and
a third optical device which combines the optical radiation from the first polarization maintaining segment and the second segment for transmission to the sensor; and
a return arm for receiving optical radiation from an optical circulator receiving optical radiation from the third optical device and passing the received optical radiation from the optical circulator to a polarization diversity detector (PDD) for producing the interrogation data.

14. The device of claim 13 wherein:
the first optical device comprises a half wave plate;
the second optical device comprises a polarization beam splitter;
the third optical device comprises a polarization beam combiner.

15. The device of claim 13 wherein:
the first polarization maintaining optical fiber segment is connected directly to the second optical device and the third optical device; and
the second segment comprises a second polarization maintaining optical fiber segment connected directly to the second optical device and a Faraday rotator, and a third polarization maintaining optical fiber segment directly connected to the Faraday rotator and the third optical device.

16. The device of claim 13 wherein the outbound arm minimizes polarization fading effects and maximally mitigates birefringence effects.

17. The device of claim 13 comprising plural additional optical subnetworks having a same arrangement as the first optical subnetwork.

18. The device of claim 17 consisting of four optical subnetworks, consisting of the first optical subnetwork and three additional optical subnetworks having the same configuration as the first optical subnetwork.

19. The device of claim 17 comprising a shape sensing system comprising an optical network which includes the plural optical subnetworks.

20. A method for obtaining optical frequency domain reflectometry data using optical frequency domain reflectometry (OFDR) from an optical network and for mitigating birefringence, the optical network comprising plural optical subnetworks, the optical subnetworks each comprising (a) a reference arm comprising a first, single mode fiber segment optically connected to a first coupling point; and (b) a measurement arm distinct from the reference path and comprising a Michelson interferometer, the measurement arm comprising: (i) an outbound arm for sending optical radiation received from the source to a sensor and comprising plural optical devices which reduce polarization fading effects and mitigate birefringence through a state of polarization of the optical radiation, the plural optical devices including a first optical device which rotates polarization of the optical radiation, a second optical device which splits the rotated polarization optical radiation into a first polarization maintaining segment and into a second segment which further rotates polarization of the optical radiation, and a third optical device which combines the optical radiation from the first polarization maintaining segment and the second segment for transmission to the sensor; and (ii) a return arm for receiving optical radiation from the third optical device and passing the received optical radiation to a polarization diversity detector (PDD) for producing the interrogation data; the method comprising, with respect to each of the optical subnetworks:
acquiring OFDR interferometric interrogation data from a multifiber bundle (MFB);
extracting current phase signal data from the OFDR interferometric interrogation data for the optical subnetworks;
calculating a change in phase between the current phase signal data and previously acquired reference phase signal data from the OFDR interferometric interrogation data for the optical subnetworks;
calculating a phase difference of the measurement arm relative to the reference arm; and
converting the compensated distribution from units of the OFDR interferometric interrogation data to units of twist to calculate MFB twist distribution data along the MFB;
wherein birefringence is at least partially removed from the measurement arm.

21. The method of claim 20 wherein the MFB comprises at least three single core radially offset fibers helically wrapped about and rigidly adhered to a central single core fiber.

22. The method of claim 20 wherein removal of birefringence includes minimizing polarization fading effects and maximally mitigating birefringence effects.

* * * * *